United States Patent

[11] 3,632,416

[72] Inventors Thomas H. Shepherd;
 Francis E. Gould, both of Princeton, N.J.
[21] Appl. No. 678,521
[22] Filed Oct. 27, 1967
[45] Patented Jan. 4, 1972
[73] Assignee National Patent Development Corporation
 New York, N.Y.
 Continuation-in-part of application Ser. No. 654,044, July 5, 1967, which is a continuation-in-part of application Ser. No. 567,856, July 26, 1966, now Patent No. 3,520,949. This application Oct. 27, 1967, Ser. No. 678,521

[54] FIBROUS TEXTILE MATERIALS IMPREGNATED WITH HYDROXYALKYL METHACRYLATE CASTING SYRUPS
 8 Claims, No Drawings

[52] U.S. Cl. ..................................................... 117/135.5,
 117/138.8 F, 117/138.8 N, 117/139, 117/143 R,
 117/161 UB, 117/161 UC, 128/335.5
[51] Int. Cl. ........................................................ C09d 3/80,
 D06m 15/38
[50] Field of Search ............................................ 117/161
 UC, 161 UB, 138.8 F, 138.8 A, 138.8 N, 139, 143
 R, 139.5 A, 135.5; 128/335.5

[56] References Cited
UNITED STATES PATENTS

| | | | |
|---|---|---|---|
| 3,488,215 | 1/1970 | Shepherd et al. | 117/161 X |
| 3,515,579 | 6/1970 | Shepherd et al. | 117/161 X |
| 3,520,949 | 7/1970 | Shepherd et al. | 117/161 X |
| 2,628,945 | 2/1953 | Wayne | 260/2.5 |
| 2,734,506 | 2/1956 | Nichols et al. | 128/335.5 |
| 2,734,507 | 2/1956 | Nichols et al. | 128/335.5 |
| 3,038,867 | 6/1962 | Czepiel | 260/2.5 |
| 3,066,110 | 11/1962 | Cornell | 260/2.5 |
| 3,200,099 | 8/1965 | Lewis et al. | 117/161 |
| 3,206,418 | 9/1965 | Giberson | 260/2.5 |
| 3,218,305 | 11/1965 | Krieble | 260/86.1 |
| 3,274,289 | 9/1966 | Murdock et al. | 260/857 |
| 3,278,639 | 10/1966 | Matray | 260/857 |
| 3,322,731 | 5/1967 | Cook et al. | 264/176 |
| 3,356,761 | 12/1967 | Fox | 264/176 |
| 3,377,249 | 4/1968 | Marco | 117/143 X |
| 3,383,448 | 5/1968 | Bader et al. | 264/171 |
| 2,976,576 | 3/1961 | Wichterle | 117/161 X |
| 2,645,012 | 7/1953 | Hetzel | 117/161 X |
| 3,220,960 | 11/1965 | Wichterle et al. | 117/161 X |
| 3,265,529 | 8/1966 | Caldwell et al. | 117/161 X |

FOREIGN PATENTS

| | | | |
|---|---|---|---|
| 511,802 | 4/1955 | Canada | 117/161 |
| 648,669 | 9/1962 | Canada | 117/138.8 |
| 660,881 | 4/1963 | Canada | 117/138.8 |
| 1,130,653 | 11/1968 | Great Britain | 117/161 |

OTHER REFERENCES

Journal of Applied Polymer Science, " Hydrogels from 1-Hydroxyethyl Methacrylate and Propylene Glycol Mono-Acrylate," Refoto et al., Vol. 9, 1965, pp. 2,425– 2,435.

Nature, " Hydrophylic Gels for Biological Use," pp. 117–118, Wichterle et al., No. 4706, 1/9/60.

*Primary Examiner*—William D. Martin
*Assistant Examiner*—Mathew R. P. Perrone, Jr.
*Attorney*—Christen & Sabol

ABSTRACT: A process for impregnating fiber and textile materials with hydrophilic polymers prepared by admixing in a solvent-free system in the presence of a free radical, vinyl polymerization catalyst and reacting a major amount of a water-soluble polymerizable monoester of an olefinic acid having at least one substituted functional group with a minor amount of a polymerizable diester of one of said olefinic acids having at least two esterifiable hydroxy groups, such as 2-hydroxy ethyl methacrylate or hydroxy propyl methacrylate. Suitable cross-linking agents include ethylene glycol dimethacrylate, 1,3-butylene dimethacrylate, 1,4-butylene dimethacrylate or other polyfunctional monomeric esters. The fiber and textile materials can be impregnated from liquid casting syrups, from alcoholic solution of the polymer, or from aqueous emulsion of the polymer. The impregnated polymer exhibits an elongation of about 5 percent or less in the dry state.

FIBROUS TEXTILE MATERIALS IMPREGNATED WITH HYDROXYALKYL METHACRYLATE CASTING SYRUPS

This application is a continuation-in-part of application Ser. No. 654,044, filed July 5, 1967, which is a continuation-in-part of application Ser. No. 567,856, filed July 26, 1966, now U.S. Pat. No. 3,520,949.

This invention relates to the treatment of fibers and textiles with hydrophilic polymers preferably in the form of liquid casting syrups adapted to be polymerized in situ with or without additives in the form of solutions or as prepared in the form of an aqueous emulsion capable of yielding a polymer soluble in alcohol suitable for impregnation of the fiber or textile material.

It is known to treat fabrics with water-swellable elastomer having an elongation of at least 200 percent in the dry state to produce breathable fabrics wherein the elastomer layer, when in contact with water, swells from 50 to 500 percent of the volume of the elastomer when out of contact with water, such process being disclosed in U.S. Pat. No. 3,265,529, issued Aug. 9, 1966, to Caldwell et al. Surprisingly, we have found that vapor-permeable (breathable) water-resistant fabrics can be achieved by virtue of the present invention involving treatment with hydrophilic elastomers which in the dry state have an elongation of about 5 percent when applied from an ethanolic solution as hereinafter described and having an elongation of substantially less than 5 percent when applied to the fabric in prepolymer form as by means of liquid casting syrups with direct in situ polymerization as hereinafter described. Additionally, it has been found that by copolymerizing, for example, hydroxy ethyl methacrylate with a minor percentage of a monomer such as butyl methacrylate, elongation of the elastomer in the dry state can be varied in ranges up to about 5 percent elongation in the dry state. It will be apparent that the minor percentage of monomer may include or may employ other hexyl ethyl methacrylate, hydroxy propyl methacrylate, and corresponding acrylate esters.

A further advantage of the hydrophilic elastomers employed in the present invention resides in their high rate of swelling which eliminates the necessity of employing a hydrophobic elastomer therewith to delay water absorption until the swelling action takes place.

A further advantage of the hydrophilic elastomers employed in the present invention is the ability to employ same in the form of water emulsions as opposed to the prior art solutions. Additionally, crease-resistant characteristics may be imparted to the textile by employment of trace amounts of monomer with the ethanol solution of example 11 as hereinafter set forth. Thus, by the addition of trace amounts of monomer sufficient cross linking is achieved to provide the elastomer which is insoluble in all common solvents and which can be employed to impart permanent press to fabrics so treated.

In one form of the invention, novel hydrophilic polymers in the form of casting syrups disclosed in pending U.S. application, Ser. No. 567,856, filed July 26, 1966, now Pat. No. 3,520,949, and Ser. No. 654,044, filed July 5, 1967, of which this application is a continuation-in-part, are employed. Such liquid casting syrups in prepolymer form may be employed to impregnate the fiber or textile with direct in situ polymerization.

Such liquid casting syrups are prepared by mixing a major amount of suitably purified commercial polymerizable monoester of an olefinic acid containing at least one substituted hydrophilic functional group with a minor concentration of a free radical catalyst and heating from ambient temperature to 80° C. until the polymerized portion of the monomer no longer shows water solubility. This product is then cooled to room temperature and addition of theoretical catalyst content carried out. The casting syrup can then be suitably dyed and pigmented and the fluid viscosity increased as desired by addition of appropriate thickening agents.

The polymer obtained from the casting liquids has good mechanical strength, reversible fluid absorption properties, the ability to retain its shape in a fluid media and to elastically recover it after deformation.

Prior to the addition of dyes, pigments, thickening agents, or other additive components, the liquid casting syrups are added to an excess quantity of water to form a precipitated polymer. The latter is soluble in highly polar organic solvents such as alcohols, glycols, and glycol ethers. The precipitated polymer, when dissolved in polar solvents, is used as a polymer solution for the formation of impregnations of the fiber and textile.

In a further embodiment of the invention, hydrophilic soluble thermoplastic polymers are prepared by suspension polymerization of hydroxy ethyl methacrylate in a nonpolar medium such as silicone oil or mineral oil. The monomer-containing catalyst is dispersed in the nonpolymer medium in the form of small droplets which polymerize to form finely divided spheres or beads. Such beads may be dissolved in polar organic solvents for the preparation impregnation solutions.

Starting materials which may be utilized in accordance with the present invention are hydroxy alkyl esters of an alpha-beta unsaturated carboxylic acid such as 2-hydroxy ethyl methacrylate, hydroxy propyl methacrylate, and the like. These are admixed in a water-free system with appropriate quantities of a free radical catalyst such as tertiary butyl peroctoate, isopropyl percarbonate, benzoyl peroxide, and the like and a suitable cross-linking monomer such as ethylene glycol dimethacrylate, 1,3-butylene dimethacrylate, 1,4-butylene dimethacrylate or other polyfunctional monomeric esters.

Free radical catalyst concentrations in the range of 0.05 g. to 1 g. catalyst per 100 g. of polymerizable hydroxy alkyl ester have been found to be adequate with the preferred quantity being between 0.1 and 0.2 per 100 g. starting material.

The mechanical properties imparted to the polymer of the invention and its ability to retain water as a homogeneous constituent are strongly influenced by the proportion of polyfunctional cross-linking agent present. For the polymer of this invention, concentrations of 0.05 to 15 g./100 g. of 2-hydroxy ethyl methacrylate have been found convenient, the preferred range being 0.1 to 0.2 g. cross-linking agent per 100 g. of polymerizable hydroxy alkyl ester.

Polymerization of the above reactants may be accelerated by the application of heat or, by selecting the catalyst and the amount thereof, the application of heat may be omitted and rapid polymerization induced at ambient temperatures. In instances where heat is applied for curing, temperatures ranging from about 20° C. to about 150° C. have been found to be convenient with 40° to 70° C. being the preferred range.

Fibers and textiles impregnated according to the present invention are enhanced in accordance with the present invention. Thus, certain properties inherent in the fiber or textile may be improved and upgraded and new and desirable properties may be imparted thereto by virtue of the present invention. Thus, hand and feel, flexibility, wear resistance, appearance, etc., may be improved. Additionally, existing properties of the base hydrophilic polymer material may be modified to improve and upgrade existing properties of the impregnated fiber or textile, as by the incorporation therewith of a minor amount of one or more additive components selected from the group consisting of resins, rosin esters, phenoxy resins, silicone resins, low molecular weight polyisobutylenes, synthetic polymers and prolamines.

The new compositions are especially adapted to form polybiends, which produce new properties and improve and upgrade existing properties of the base hydrophilic polymer.

The mixture is heated or otherwise cured in the absence of compatible volatile or nonvolative organic solvents to produce thermosetting polymeric materials having properties superior to those of the major constituent of the formulation. The upgraded properties of these new compositions of matter include, but are not necessarily limited to, improved hardness, adhesion, abrasion resistance, resiliency, and toughness.

Other slight property improvements can be effected through use of small amounts of other cross-linking glycol dimethacrylate.

The process of the present invention may be used to produce thermosetting fiber and textile impregnations having improved adhesion clarity and toughness characteristics.

In general, 2-hydroxy methacrylate and the cross-linking monomer ethylene glycol dimethacrylate in quantities ranging from 10 to 50 percent by weight (preferred range of 50 percent) is mixed with 9–50 percent by weight of a commercially available resin of the coumaron indene type or their phenol modified counterparts in the presence of a free radical catalyst such as tertiary butyl peroctoate, isopropyl percarbonate, etc., and heated at temperatures ranging from 40° to 200° C. for approximately 30 minutes. Organic or inorganic solvents are used as necessary to increase compatibility of the components. Compatible polymers having improved properties of tensile strength, modulus, hardness, thermal conductivity, etc., are formed. The foregoing preferred proportional limitations also are employed with the phenoxy resin and the silicone resin additive components.

The mechanical properties imparted to the polymer of the invention and its ability to achieve isotonicity with the surrounding tissue are strongly influenced by the proportion of polyfunctional cross-linking agent present. For the polymers of this invention, concentrations of 0.05 to 15 g./100 g. of 2-hydroxy ethyl or hydroxy propyl methacrylate have been found to be convenient, the preferred range being 0.1 to 1.0 g. cross-linking agent per 100 g. of polymerizable hydroxy alkyl ester.

The fiber or textile material to be impregnated may be reinforced with strengthening material such as woven glass fibers, Dacron and the like, in various mill and denier sizes, it being found that the nonglass strengthening fibers are capable of being impregnated in accordance with the present invention.

Polymerization of the casting solutions may be accelerated by the application of heat or, by selecting the catalyst and the amount thereof, the application of heat may be omitted and rapid polymerization induced at ambient temperatures. In instances where heat is applied for curing temperatures broadly ranging from about 20°–150° C. are used with ranges from about 20°–100° C. being found convenient, the preferred range being about 40°–80° C. The reaction preferably is performed in an inert or anaerobic atmosphere employing carbon dioxide or nitrogen. It is known that the presence of oxygen inhibits the polymerization reaction thus requiring a longer reaction time or the use of increased polymerizing temperatures.

In still another embodiment of the invention, the hydrophilic gel materials of the present invention may be employed in the form of a covering or bandage carrying medication which can be slowly released from the hydrophilic gel material. Preferably, the bandage is formed of a plastic mesh reinforcement member carrying the hydrophilic gel material in the form of a strip or layer which has been cast thereon.

These and other objects and embodiments of the invention will be readily understood by reference to the following examples which are given by way of illustration without limitation.

EXAMPLE 1

One hundred g. 2-hydroxy ethyl methacrylate is stirred with 0.15 g. isopropyl percarbonate in an anaerobic atmosphere at ambient temperature. 0.1 g. ethylene glycol dimethacrylate is added. Before casting, a 2 percent aqueous solution of Merbromin is added as a general antiseptic. The resulting solution is cast onto a dacron mesh cloth in the form of a film to result in a bandage form upon curing for 30 minutes at 40° C. The dried bandage, upon being wetted by immersion in water, or on contact with the lymphatic exudate of an open wound or with mucous membrane, gradually releases the antiseptic.

EXAMPLE 2

A sheet or film in bandage form is made in accordance with example 1 having a thickness range from about 5 mils to 1.5 mm. In place of the general antiseptic the topical antibiotic neomycin sulfate is added before casting in an amount of 5 mg. (equivalent to 3.5 mg. base) per gram of polymeric carrier. The resultant film is employed as a temporary covering for burns, it being found that the antibiotic loading of the polymer in contact with flesh burns prevents the dreaded complication of pseudomonas injection and septicemia as well as limiting fluid loss from the burn surface.

EXAMPLE 3

2-hydroxy ethyl methacrylate (100 parts) is combined with t-butyl peroctoate (0.05 part) at 25° C. in an inert atmosphere. This mixture is combined with nylon-6 (100 parts) in trifluoroethanol (85 parts) to form a clear solution. This is heated at 65° to 70° C. to form a prepolymer. The prepolymer solution is cooled to 25° C. and t-butyl peroctoate (0.10 part) and ethylene glycol dimethacrylate (0.2 part) is added. The viscous syrup is passed through an extruder having an orifice of 0.01 inch in diameter. The extruded fiber is passed immediately into a heated water bath, maintained at a polymerizing temperature of 80° C. After 30 minutes the solid fiber is removed from the water, is air dried and oriented at 100° C.

Fabrics made from this fiber are extremely smooth in texture and have a high degree of softness to the touch.

EXAMPLE 4

The process of example 6 is followed with the exception that a textile mouth guard impression is molded from an impression by use of the said casting syrup. If desired, a reinforcing center element of rubber may be dip-coated with the casting syrup so as to provide additional rigidity.

EXAMPLE 5

Bristles adapted for use in tooth brushes, cleansing brushes, and the like may be prepared by the process described in example 3. If additional strength is desired for the bristles, they may be formed with an axial fiber of nylon or the like and dip-coated as described in the foregoing example 4, the reinforcing center element being of rubber, plastic or the like.

EXAMPLE 6

Distilled 2-hydroxy ethyl methacrylate (100 g.) is stirred with 0.1 g. tertiary butyl peroctoate in an anaerobic atmosphere at 25°–70° C. for 15–40 minutes. The resultant mixture is cooled to 25° C. and tertiary butyl peroctoate added so as to make the total concentration of tertiary butyl peroctoate in the system 0.2/100 grams of 2-hydroxy ethyl methacrylate. Ethylene glycol dimethacrylate, in the concentration of 0.2 g./100 g. of 2-hydroxy ethyl methacrylate is added at the same time as the catalyst concentration is brought up to the theoretical content. Micro silica of particle sizes 0.15–0.02 micron (commercial "Cab-O-Sil") is post added to the casting syrup to yield a prepolymer syrup of desired rheological properties for use as a denture liner base material.

The casting syrup may be spread on a standard polymeric acrylic textile base material and, after being impressed, polymerized with same in a single polymerizing process in a standard molding flask under standard conditions of time, temperature and pressure. In the case of existing polymerized textile bases, the casting syrup may be spread thereon and, after being impressed, polymerized under standard denture molding conditions, the latter being disclosed in U.S. Pat. No. 2,645,012. Casting syrups for in situ polymerization to form various articles having specific desired properties such as mechanical strength, high reversible fluid absorption properties, shape retention in fluid media, and elasticity recovery after deformation are thereby formed.

EXAMPLE 7

Raw cotton suture thread is immersed in the casting syrup of example 6 with thickening agent omitted and is passed through a polymerization zone having a nitrogen atmosphere maintained at 100° C. Residue time in the zone is held at 1½ hours. The coated, impregnated suture so obtained is soaked in an alcoholic solution of fluorothiouracil and penicillin, and is then dried. The surgical suture thus obtained is beneficial in preventing spread of infection and spurious cell migration along suture lines during postoperative healing.

EXAMPLE 8

A rubber Foley catheter is immersed in the casting syrup of example 6 with the thickening agent omitted, and then is removed and subjected to a temperature of 80° C. in an inert atmosphere to effect polymerization of the coating thus applied. The coated catheter is then immersed in an aqueous solution of neomycin sulfate and is then dried to provide a catheter effective in preventing infections when used in the urinary tract. A catheter of Dacron fabric tubing is similarly impregnated.

EXAMPLE 9

The process of example 8 is employed to coat tubes of various sizes for use as vessel grafts and substitutes, common ducts, urethral replacement segments, and lung tracheal segments. It has been found that venus tubes deep-coated with ethyl alcohol solutions of the polymer preparations of example 10 can be placed in the inferior and superior of the vena cava for extended periods whereas uncoated plastic tubes ordinarily clot in the venous stream within minutes. Such dip coating can be applied to thrombogenic plastics to body insert materials and heart valve component fabrication. The polymer solution of example 8 in aqueous ethyl alcohol also is adapted to be cast in situ as a film for the impregnation of fibers, such as threads employed in surgery so to deter adhesion formation.

EXAMPLE 10

One hundred g. of casting syrup of example 8 was added to three times its volume of water with vigorous agitation. The white precipitate so obtained was isolated by filtration and dried to yield 9.0 g. of polymer showing an intrinsic viscosity of 1.03 when dissolved in absolute methanol. The polymer, as dissolved in methanol, is suitable for the formation of hydrophilic coatings and films for fibers and textiles, as by spray coating, dip coating, casting and the like. The resulting cast polymer exhibited controlled hydrophilic properties being incapable of absorbing more than 30 percent water when equilibrated in aqueous medium.

EXAMPLE 11

Into a flask equipped with an agitator and a heating mantle was charged 1,000 grams of silicone oil; 100 grams of 2-hydroxy ethyl methacrylate and 0.33 gram of isopropyl percarbonate. The flask was placed under a nitrogen atmosphere and the contents were rapidly agitated and heated to 100° C. After 15 minutes at 100° C., the polymer slurry obtained was filtered hot to isolate the polymer. The polymer powder was reslurried in 300 ml. of xylene, filtered and dried. A 98 percent yield of 2 $\mu$ to 5 $\mu$ particle size powder size was obtained. The powder was dissolved in ethanol to form solutions for impregnating fibers and textiles therewith.

EXAMPLE 12

To the ethanolic solution of example 11 was added the antibiotic chloramphenicol and the resulting solution was employed to coat a nylon suture.

EXAMPLE 13

A 50 percent Dacron-cotton twill obtained from Test Fabrics, Inc. was first treated with a urea-formaldehyde-type, wash-wear finish; namely, Warwick Chemical Division's Perma-Fresh 183 ("Perma-Fresh 183") at about the 3 percent level, then cured at 160° C. for 5 minutes. The wash-wear finished fabric was rinsed and dried following which a 2 percent deposition of the ethanolic solution of example 11 was applied and the so-treated fabric was dried. Swatches of the fabric were spotted in a standard test procedure involving dirty motor oil, clean motor oil, and Wesson oil. The swatches were left overnight to ensure penetration of the stain and were then washed in a synthetic detergent, Tide, sold by Proctor & Gamble, in a standard washing cycle together with other cloth to bulk up the load. The results showed improvements of untreated swatches as to the antisoiling properties.

EXAMPLE 14

An all-Dacron fabric was coated with a 2 percent deposition of ethanolic solution of example 11. After drying, the fabric was subjected to six wash-dry cycles in a standard household automatic washer-dryer machine, the dried fabric being weighed between each cycle. No significant weight loss was detected during or after the six cycles. The impregation of the hydrophilic coating was firmly bonded to the fabric and exhibited an improved comfort hand with a substantial limitation of the "clammy" feel of all-synthetic fabrics.

EXAMPLE 15

A 20 percent solution of example 11 was applied to a fabric by dipping one surface of the fabric in the polymer solution and maintaining the other surface dry. The resulting fabric, when dried, exhibited air permeability as measured by the Gurley Densometer. Upon wetting, the fabric became impermeable. Excess liquid water was blotted from the surface of the fabric to result in air permeability. The fabric was subjected to a single hydrostatic test, it being found that water did not penetrate the fabric although a slight weeping effect was noted in the area where the water touched the underside of the fabric.

We claim:

1. A method comprising impregnating a fibrous textile material with a solvent-free casting syrup of a major amount of hydroxyethyl methacrylate or hydroxypropyl methacrylate polymerized to the extent that it is water insoluble and (2), an amount of 0.05 to 15 percent of said methacrylate of a monomeric diester of an olefinic acid having at least esterifiable hydroxyl groups as a cross-linking agent and thereafter completing the polymerization on said textile to produce a vapor permeable cross-linked water-insoluble hydrophilic product.

2. A method according to claim 1 wherein the cross-linking agent is present in an amount of 0.05 to 1 gram per 100 grams of monoester.

3. A method according to claim 1 wherein there is added to the casting syrup sufficient free radical catalyst to hasten the completion of the polymerization.

4. A method according to claim 1 wherein the fibrous material is in the form of a suture.

5. A method according to claim 1 wherein the fibrous material is in the form of a wound dressing.

6. A method according to claim 1 wherein said casting syrup includes hydroxyethyl methacrylate or hydroxypropyl methacrylate monomer.

7. A method according to claim 6 wherein the polymerization is carried out to an extent to produce a substantially completely polymerized hydrophilic copolymer incapable of absorbing more than up to about 30 percent by weight of water when equilibrated in aqueous solution.

8. The product prepared by the method of claim 1.

* * * * *